United States Patent
Hodges et al.

(10) Patent No.: US 9,108,468 B2
(45) Date of Patent: Aug. 18, 2015

(54) TIRE BEAD MOUNTING VERIFICATION SYSTEM

(75) Inventors: Dennis D. Hodges, Lone Jack, MO (US); Fang Zhu, Greer, SC (US)

(73) Assignees: Michelin Recherche et Technique S.A., Granges-Paccot (CH); Compagnie Generale Des Etablissments Michelin, Clermont-Ferrand (FR)

( * ) Notice: Subject to any disclaimer, the term of this patent is extended or adjusted under 35 U.S.C. 154(b) by 478 days.

(21) Appl. No.: 13/307,910

(22) Filed: Nov. 30, 2011

(65) Prior Publication Data

US 2013/0133801 A1    May 30, 2013

(51) Int. Cl.
*B60C 15/02*    (2006.01)
*B60C 15/00*    (2006.01)
(Continued)

(52) U.S. Cl.
CPC ............... *B60C 13/001* (2013.04); *B60C 5/00* (2013.01); *B60C 15/02* (2013.01); *B60C 15/024* (2013.01);
(Continued)

(58) Field of Classification Search
CPC .... B60C 13/001; B60C 15/02; B60C 15/024; B60C 15/0242; B60C 5/00; B60C 13/00; B60C 15/00; B60C 19/00; B60C 25/00; B60C 99/00; B60C 5/16; B60B 21/12; B60B 25/22; B60B 2900/523; B60B 2900/521; B60B 2900/911; Y10T 29/49494; Y10T 29/49492; Y10T 29/49764; Y10T 29/49771; Y10T 152/10; Y10T 152/10495; Y10T 152/10819; Y10S 152/09
USPC ............. 152/151, 450, 513, DIG. 9, DIG. 12, 152/539, 544, 523, 524; 73/146; 33/203.18, 33/203.19, 203, 520, 203.11, 1 C; 116/34 R, 34 A, 334, 337; 29/894.31, 29/894.3, 407.05, 407.1, 407.01; 157/1; 40/587; 283/115, 44
See application file for complete search history.

(56) References Cited

U.S. PATENT DOCUMENTS 400,017 A * 3/1889 Swain ........................ 283/115 X
1,713,811 A * 5/1929 Andres ...................... 283/115 X
(Continued)

FOREIGN PATENT DOCUMENTS

EP    1 240 033 B1    10/2006
FR    1.015.316    *    9/1952
(Continued)

OTHER PUBLICATIONS

English machine translation of JP 2005-297717 A, Oct. 27, 2005.*
(Continued)

*Primary Examiner* — Adrienne C Johnstone
(74) *Attorney, Agent, or Firm* — Hahn Loeser & Parks, LLP; Bret A. Hrivnak

(57) ABSTRACT

The invention includes a tire having a pair of annular sidewalls each extending to a terminal end including a bottom surface for mounting onto a wheel. The tire further includes indicia arranged along each sidewall adjacent a bottom of each sidewall terminal end. The indicia extends radially outward from an initial position to extend from a top side of a rim flange of a tire wheel for indicating concentric mounting of the tire on a wheel. In particular embodiments, the tire is mounted on a rim of a wheel having rim flanges, each of the rim flanges extending along one of the tire sidewalls such that the indicia is adjacently arranged the rim flange along each sidewall such that the indicia extends radially outward from a top of the rim flange. Methods include using the indicia to determine whether the tire is concentrically mounted on the wheel.

6 Claims, 5 Drawing Sheets

(51) Int. Cl.
  *B60C 5/00* (2006.01)
  *B60C 19/00* (2006.01)
  *B60C 13/00* (2006.01)
  *B60C 25/00* (2006.01)
  *B60C 15/024* (2006.01)

(52) U.S. Cl.
  CPC ............. *B60C 15/0242* (2013.04); *B60C 19/00* (2013.01); *B60C 25/00* (2013.01); *B60B 2900/521* (2013.01); *B60B 2900/523* (2013.01); *B60B 2900/911* (2013.01); *Y10T 29/49494* (2015.01); *Y10T 29/49771* (2015.01); *Y10T 152/10* (2015.01); *Y10T 152/10495* (2015.01); *Y10T 152/10819* (2015.01)

(56) References Cited

U.S. PATENT DOCUMENTS

| | | | | |
|---|---|---|---|---|
| 2,007,825 | A | * | 7/1935 | Day .............................. 152/450 |
| 2,031,560 | A | * | 2/1936 | Day ........................ 152/450 X |
| 2,047,859 | A | * | 7/1936 | Day .............................. 152/539 |
| 2,268,249 | A | * | 12/1941 | Goodrich |
| 2,511,953 | A | * | 6/1950 | Tallman .................... 283/115 X |
| 3,203,461 | A | * | 8/1965 | Enabnit ............... 152/DIG. 9 X |
| 3,861,438 | A | * | 1/1975 | Bertelli et al. ............ 152/513 X |
| 4,353,403 | A | * | 10/1982 | Ruip ............................. 152/523 |
| H1283 | H | * | 2/1994 | Porto et al. ................ 152/524 X |
| 5,443,105 | A | * | 8/1995 | Ushikubo et al. ......... 152/544 X |
| 5,538,059 | A | * | 7/1996 | Brayer ...................... 152/513 X |
| 5,573,612 | A | * | 11/1996 | Tagashira et al. ............. 152/544 |
| 5,660,655 | A | * | 8/1997 | Tagashira et al. ............. 152/544 |

FOREIGN PATENT DOCUMENTS

| | | | |
|---|---|---|---|
| GB | 785094 | * | 10/1957 |
| JP | 08216633 A | * | 8/1996 |
| JP | 11139116 A | * | 5/1999 |
| JP | 2005297717 A | * | 10/2005 |
| WO | WO-2010/073273 A1 | * | 7/2010 |

OTHER PUBLICATIONS

English machine translation of FR 1.015.316, Sep. 15, 1952.*
Probability and Statistics for Engineers, Third Edition, ed. Irwin Miller and John Freund, Prentice-Hall Inc., Englewood Cliffs, New Jersey, USA, 1985, p. 56.*
Excerpts from Michelin Truck Tire Service Manual, 2005, 6 pgs.
Goodyear, Retreads: More Kilometres per Tyre and Significant Cost Savings, Next Tread, Jun. 14, 2004, 4 pages.
Goodyear Dunlop, "Dunlop Launches SP344 and SP444 Regional Steer and Drive Tires", Truck Tire News, Dec. 16, 2005, p. 2, vol. 2, Issue 4, 6 total pages.
Close-Up of Dunlop tires from p. 2 of Truck Tire News, Dec. 16, 2005, p. 2, vol. 2, Issue 4, 1 total page.
Goodyear Dunlop, "Dunlop MultiTread", Truck Tire News, Nov. 24, 2010, vol. 7, Issue 3, 11 total pages.
Close-Up of Dunlop MultiTread SP 444 from p. 5 of Goodyear Dunlop, "Dunlop MultiTread", Truck Tire News, Nov. 24, 2010, p. 5, vol. 7, Issue 3, 1 total page.
Goodyear, Marathon LHT II Data Sheet, Jun. 29, 2010, 2 total pages.
Close-Up of Goodyear Marathon LHT II tires from Goodyear, Marathon LHT II Data Sheet, Jun. 29, 2010, 1 total page.
Michelin—Michelin Truck Tire Service Manual, Jan. 2005, 83 total pages.
Michelin—Michelin Truck Tire Service Manual, May 2011, 7 total pages.
Goodyear—Radial Truck Tire and Retread Service Manual, Oct. 2004, 109 total pages, in particular pp. 20-21.
American Trucking Associations—Technology & Maintenance Council Guidelines for Total Vehicle Alignment, Jan. 2003, 29 total pages, in particular pp. 11 and 20.
Goodyear, Tecnologia de Calidad Mundial, catalog, Nov. 2, 2010, 35 total pages, in particular pp. 24-26.
Close-Up of Regional RHD form p. 26 of Goodyear, Tecnologia de Calidad Mundial, catalog, Nov. 2, 2010, 1 total page.
Goodyear—Argentina Price List, Oct. 28, 2009, 10 total pages, in particular p. 6.

* cited by examiner

TIRE BEAD MOUNTING VERIFICATION SYSTEM

BACKGROUND OF THE INVENTION

This invention relates generally to tires and more specifically, to tires having indicia for verifying that a tire is concentrically mounted on a tire wheel.

DESCRIPTION OF THE RELATED ART

When mounting a tire on a wheel, it is important that the tire is mounted properly. For example, it is important that the tire is mounted concentrically on the annular wheel rim. If not, the tire may lose pressure and/or may exhibit non-uniformities resulting in increased tire wear and vibrations.

Presently, an annular guide rib is formed on each tire sidewall near its terminal end, or, in other words, near the tire bead portion. The guide rib is arranged such that it is spaced radially outward from the top of the wheel rim flange when the tire is mounted on the wheel. A user is instructed to measure the distance from the guide rib to the top of the rim flange at numerous locations around the tire. If the measurements are approximately equal, then the tire is determined to be concentrically mounted on the wheel. If the measurements deviate sufficiently, then the tire is non-concentrically mounted and reinstallation is recommended.

This present method of determining whether a tire is concentrically mounted on a wheel is tedious, labor intensive, and requires a ruler to accomplish such method. Because of this, this methods are sometime avoided, which leads to undesired consequences. Therefore, there is a need for an improved method of determining whether a tire is concentrically mounted upon a tire wheel.

SUMMARY OF THE INVENTION

The present invention includes tires having indicia arranged along each sidewall for determining whether the tire is concentrically mounted onto a wheel. The present invention also include methods making such determination. In particular embodiments, the tire includes a pair of annular sidewalls each extending radially inward from a tire tread portion to a terminal end. The terminal end includes a bottom surface for engaging a wheel when the tire is mounted on a wheel. The tire further includes indicia arranged along each sidewall adjacent a bottom of each sidewall terminal end. The indicia extend radially outward from an initial position to extend from a top side of a rim flange of a tire wheel for indicating concentric mounting of the tire on a wheel.

Particular embodiments of the invention comprise a tire-wheel assembly. The tire-wheel assembly includes a tire comprising a pair of annular sidewalls each extending radially inward from a tire tread portion to a terminal end. The terminal end includes a bottom surface for engaging a wheel when the tire is mounted on a wheel. The tire further includes indicia arranged along each sidewall adjacent each terminal end, the indicia extending radially outward from an initial position to extend from a top side of a rim flange of a tire wheel for indicating concentric mounting of the tire on a wheel. The tire-wheel assembly further includes a wheel comprising a rim upon which the tire is mounted. The rim extends in an axial direction of the wheel between opposing terminal ends forming rim flanges, each of the rim flanges extending along one of the tire sidewalls such that the indicia is adjacently arranged the rim flange along each sidewall such that the indicia extends radially outward from a top of the rim flange.

Particular embodiments of the invention comprise methods for determining concentric mounting of a tire onto a wheel. Such methods include providing a tire comprising a pair of annular sidewalls each extending radially inward from a tire tread portion to a terminal end, each sidewall including indicia arranged along each sidewall adjacent each terminal end along an outer side of the tire, the tire mounted onto a wheel comprising a rim extending in an axial direction of the wheel and upon which the tire is mounted, the rim extending between opposing terminal ends forming rim flanges whereby a top of each rim flange is arranged along an outer side of each tire sidewall and the indicia arranged along each sidewall extends radially outward from the top of each rim flange. Such methods may further include determining an indicial position along each indicia where a top of the rim flange elevationally terminates relative the indicia at each of a plurality of locations arranged annularly about the tire. The methods may also include determining whether the tire is concentrically mounted on the wheel by comparing the indicial positions determined in the previous step.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF PARTICULAR EMBODIMENTS

Particular embodiments of the present invention comprise methods of verifying whether a tire has been concentrically mounted onto a tire wheel. Further embodiments include tires having indicia arranged along each sidewall near or adjacent to the terminal end of each sidewall, or, in other words, the tire bead portion. As stated above, it is desirous to verify whether a tire has been concentrically mounted onto a wheel, or more specifically, the wheel rim, because if it is not, the tire may lose pressure and/or may exhibit non-uniformities resulting in increased tire wear and vibrations.

Figure 1:
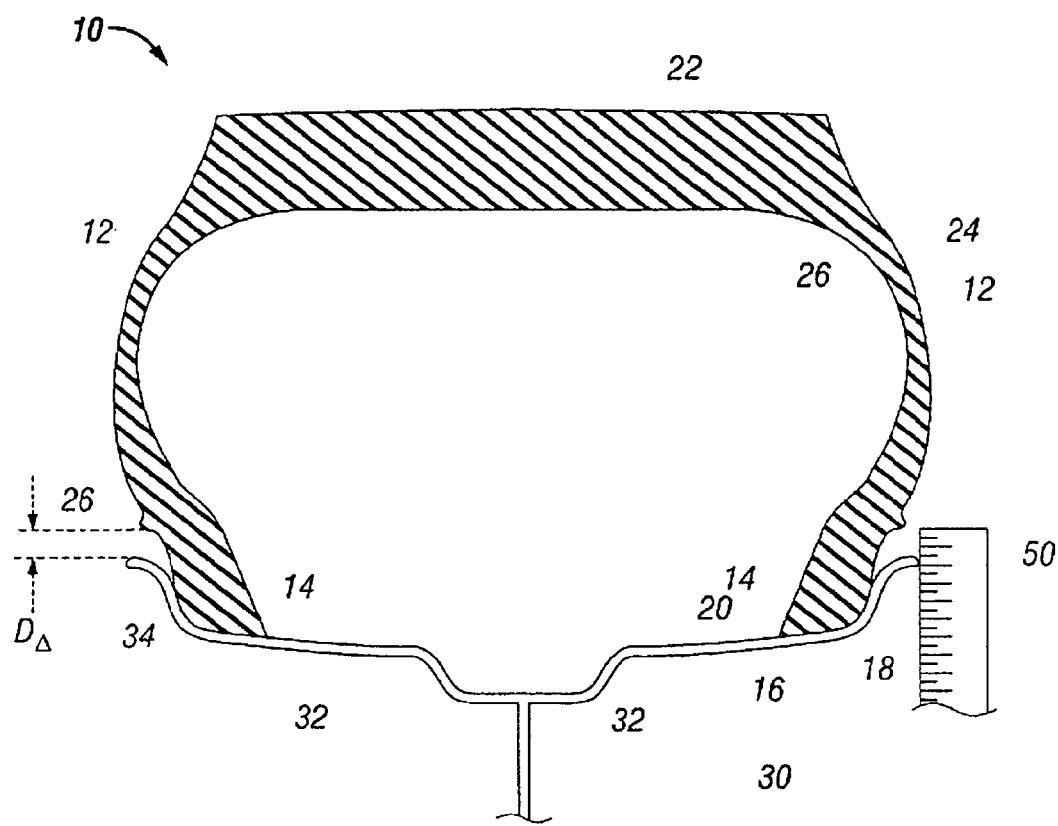
FIG. 1 is a front sectional view of a prior art tire mounted in a wheel to form a tire-wheel assembly, the tire including a guide rib arranged a distance from the top of a rim flange of the wheel, the distance being measured by a measuring device such as a ruler.

With reference to FIG. 1, for example, a prior art tire 10 is shown mounted onto a wheel 30. The wheel includes a rim 32 having a rim flange 34 forming the terminal end of the rim. The wheel and rim are, of course, annular. The tire 10 includes a pair of sidewalls 12 extending radially inward toward a rotational axis of the tire from a tread portion 22. A terminal end 14 of the sidewall, often referred to as the bead portion of the tire, is mounted onto the rim 32 of the wheel. The terminal end 14 includes a bottom side 16. A heel 18 is arranged along an outer side 24 of the tire where the sidewall 12 intersects the bottom side 16. A toe 20 is arranged along an inner side 26 of the tire where the sidewall 12 intersects the bottom side 16. A guide rib 28 having a length extending annularly along each sidewall in spaced relation from each sidewall terminal end.

With further regard to the prior art in FIG. 1, with the tire 10 mounted on the wheel 30, the rim flange 34 extends radially outward along an outer side 24 of the tire sidewall. Each guide rib 28 is spaced radially above or outward the top of each rim flange by a distance $D_A$. To verify whether the tire is concentrically mounted on the wheel, prior art methods include measuring the distance $D_A$ at a plurality of annular locations around each sidewall using a measuring tool 50, such as a ruler or the like. For example, distance $D_A$ is measured at four equally spaced locations about a sidewall separating four equal quadrants of the sidewall. If all of the measured distances are substantially the same at each annular location, or if the difference between each distance is less than less than a predetermined amount, the tire is determined to be concentrically mounted. If the difference between each distance $D_A$ is not substantially equal or differs by at least a predetermined amount, the tire is not concentrically mounted (i.e., non-concentrically mounted) and reinstallation of the tire is recommended. For example, if the difference between any of the distances $D_A$ is equal to or greater than a predetermined amount of 2/32 of an inch (2/32"), the tire is determined to be mounted non-concentrically. The deviation amongst distances $D_A$ increases when the tire is not properly mounted on the wheel, or, in other words, when the bead portion is not properly seated on the wheel rim. For example, a gap may exist between the bottom side 16 of the sidewall terminal end and the wheel rim 34 to provide an increased distance $D_A$.

Because the prior art methods require actual measurement using a separate measuring tool, tire installers may avoid such methods of verification due to the additional effort required. Further, when such methods are performed manually, an increased risk of error arises when the measuring tool is not consistently used or aligned relative the wheel and/or tire.

Particular embodiments of the invention include improved methods for verifying whether a tire is concentrically mounted onto a tire wheel. Further embodiments of the invention includes tires having tire verification indicia arranged along a tire sidewall to extend radially outward from the top of the rim flange whereby use of a measurement device, such as a ruler, is not required. The indicia allows a user to quickly inspect the mounting of a tire at the time of tire installation and any time thereafter, such as in the field, by using the indicia to obtain a distance reading (or value) at each of a plurality of locations around the tire relative the top of the rim flange reflecting how well the bead portion has been installed locally around at each location around the tire. The distance readings are then compared to determine whether the distance readings are the same, which indicates concentric mounting, or if any differ from a desired value or differ from one another by a predetermined amount or value.

Particular embodiments such methods of verifying whether a tire is concentrically mounted onto a wheel include the step of providing a tire comprising a pair of annular sidewalls each extending radially inward from a tire tread portion to a terminal end. Each sidewall includes indicia arranged along each sidewall adjacent each terminal end along an outer side of the tire. Indicia is arranged at a plurality of annular locations around the tire. The tire provided is mounted onto a wheel whereby a rim flange of the wheel terminates along an outer side of each tire sidewall and the indicia arranged along each sidewall extends radially outward from the terminal end of each rim flange. Such a tire may be a pneumatic tire, for example, where the terminal end of each sidewall is generally referred to as the bead portion. The bead portion is seated onto the wheel to create an air-tight seal therewith. Specifically, the bead portion includes a bottom surface extending generally in an axial direction of the tire between the heel and a toe, the heel arranged along an outer side of the tire and the toe arranged along an inner side of the tire. The tread area generally extends widthwise (i.e., laterally) in an axial direction of the tire and longitudinally in a circumferential direction of the tire. Pneumatic tire are shown and described in FIGS. 1-4.

Figure 2:
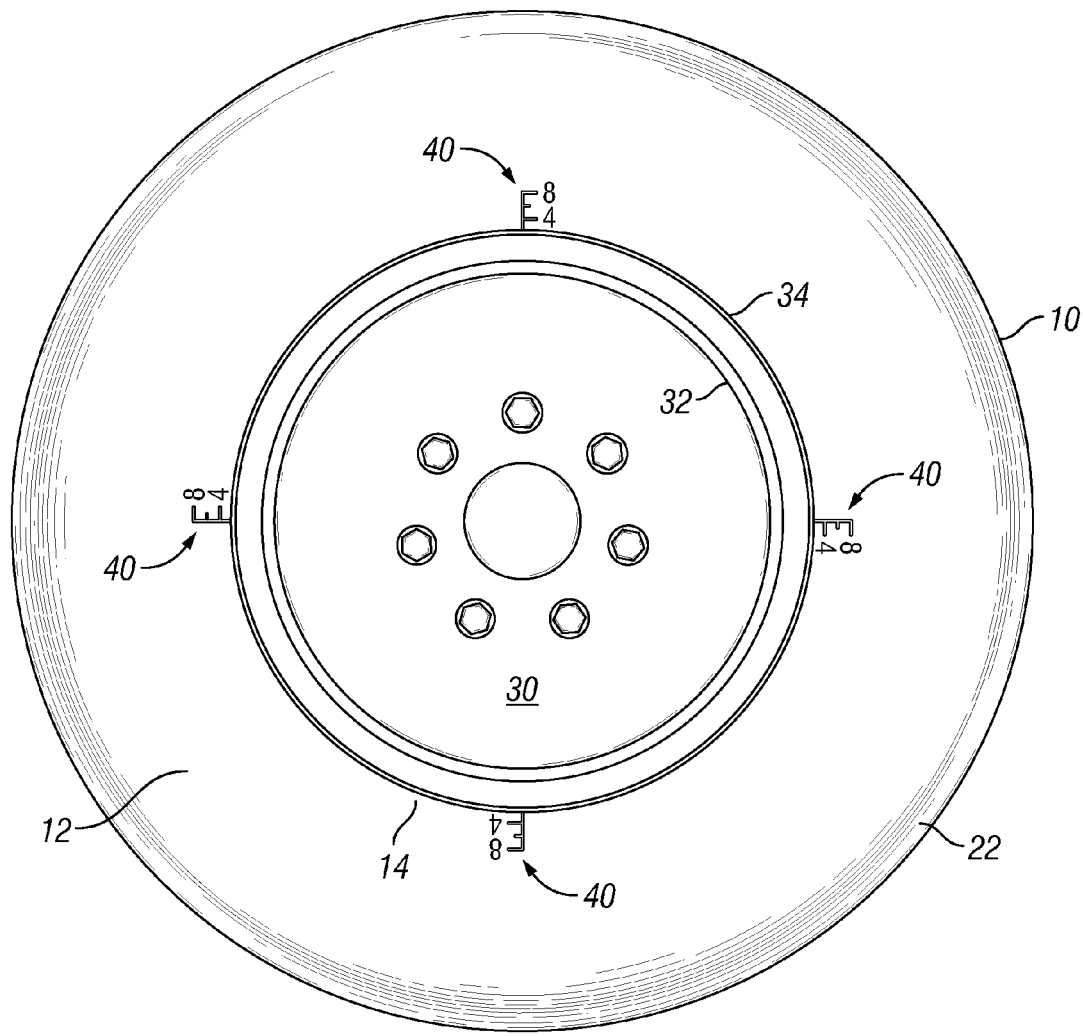
FIG. 2 is side view of a tire-wheel assembly, the tire including indicia located at four or more different annular locations spaced equal distances around the tire in accordance with an embodiment of the invention.
Figure 3:
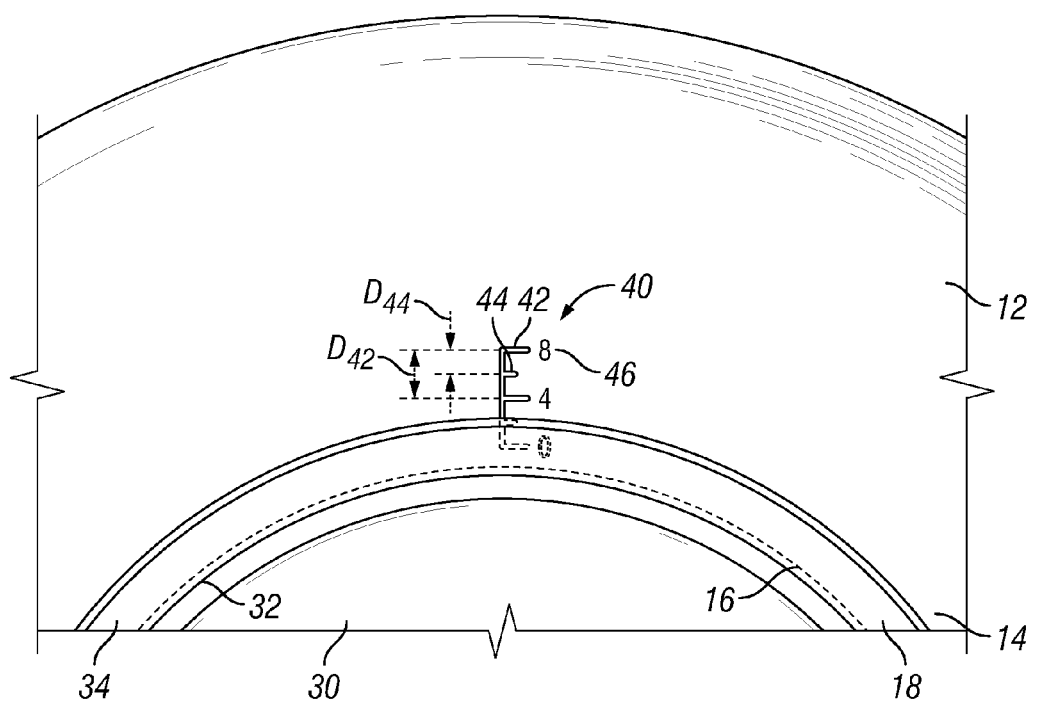
FIG. 3 is an enlarged partial side view of the tire-wheel assembly identified in FIG. 2 showing more closely the indicia arranged at one of the plurality of annular locations about the tire, the indicia comprising a scale formed of a plurality of notched indicia arranged at uniformly spaced intervals, the indicia being shown extending radially outward from an initial position below the top of the wheel rim flange to a radial position above the rim flange top in accordance with an embodiment of the invention. Reference numerals are also arranged adjacent each bar to indicate an increment associated with an increasing scale.
Figure 4:
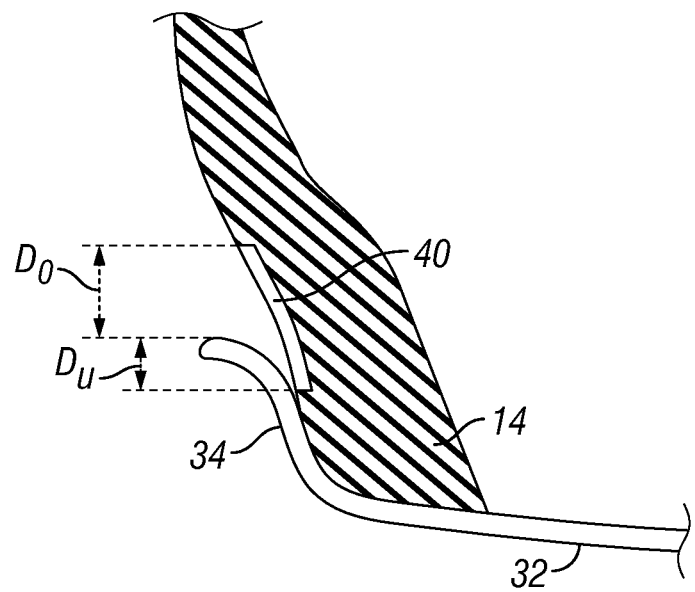
FIG. 4 is a partial front sectional view of the tire-wheel assembly shown in FIG. 3 taken along line 4-4, the view showing the indicia arranged along a tire sidewall adjacent a terminal end of the sidewall and partially behind the rim flange, the indicia extending radially outward from behind the rim flange and beyond a top of the wheel rim flange, in accordance with an embodiment of the invention. A top of the rim flange refers to the radially outermost extent of the rim flange.

With reference to FIGS. 2-4, the tire further includes indicia 40 arranged along each sidewall 12 near or adjacent to the sidewall terminal end 14 (i.e., the bead portion) on the outer side of the tire at a plurality of annular locations around the sidewall. The indicia 40 extends radially outward (i.e., toward the tread) from an initial location to indicate the position of the rim flange 34 relative the tire, and more specifically the position of the rim flange relative the indicia arranged on the tire. The relative location of the rim flange top along the indicia indicates how closely the bottom side of the bead portion is seated onto the rim. When the terminal end is described as having a heel, the indicia is arranged adjacent or near each heel. The indicia 40 is arranged along each sidewall 12 such that when the tire is mounted on a wheel 30, the indicia extends radially outward from the top of the wheel rim flange 34 a desired distance or length, which is represented by distance $D_o$ in FIG. 4. In other words, the tip of the rim flange is elevationally or radially aligned with the indicia. In certain variations, the indicia 40 first extends radially outward from a location radially inward or below the top of the rim flange, which is represented by distance $D_u$ in FIG. 4. In such instances, the adjacent indicia can be described as being arranged behind the rim flange. It is understood that the indicia can extend from the top of the rim flange without extending from behind the rim flange. In other words, the length of the indicia can be represented solely by distance $D_o$ in FIG. 4 in lieu of the combination of distances $D_o$ and $D_u$ as is shown in the figure.

To determine whether the tire is concentrically mounted, the indicia arranged at each of the plurality of annular locations must be commonly arranged relative the terminal end or bottom side of the sidewall. In other words, the radially inward position of each indicia, which is the initial position described above from which the indicia extends or radiates outwardly, is arranged the same distance from the heel 18 or the bottom side 16 to provide consistent readings or measurements from each indicia. The different annular locations are spaced about the tire to facilitate determination of whether the tire is concentrically mounted. For example, indicia are arranged at three or more annular locations generally equally spaced around the tire. By further example, indicia are arranged at eight different equally spaced annular locations. In the embodiment of FIG. 2, four equally spaced locations are employed. It is also understood that indicia may extend annularly about the sidewall in an arcuate path.

Indicia may comprise any indicia configured to allow a user to relationally measure or otherwise ascertain the location of a rim flange relative the tire sidewall. For example, with reference to FIGS. 2-4, the indicia comprises a plurality of indicium forming increments. The increments may be uniformly spaced by a known distance to together form a scale. In particular embodiments, the increments The tire of claim 1, where the increments are each equal to a whole number multiple of $\frac{1}{32}$ of an inch. For example, each increment may extend radially $\frac{1}{32}^{nd}$ of an inch ($\frac{1}{32}$") or $\frac{2}{32}$". With reference to FIG. 3, indicium 42 comprise major increments while indicium 44 comprise minor increments. In such embodiment, major increments 42 extend a distance $D_{42}$ equal to approximately $\frac{4}{32}$" while minor increments 44 extend a distance $D_{44}$ equal to approximately $\frac{2}{32}$". With reference to the embodiments shown in FIGS. 5-7, the major increments 42 extend a distance $D_{42}$ equal to approximately $\frac{2}{32}$" while minor increments 44 extend a distance $D_{44}$ equal to approximately $\frac{1}{32}$". Increments may be separately or independently identified as desired. In the example shown, the increments form lines segments or notches. By further example, indicia may separately identify different increments by other means, such where different increments are identified by any form of different size, shape, texture, color, or textual or numeric indicator. These indicators may form a portion of each increment, or may be formed separate from each increment even though each such indicator may be arranged adjacent (i.e., in close proximity) to each increment. For example, in FIGS. 2, 3, and 5-7, a reference numeral 46 is shown in association with each major increment 42 to indicate how many $\frac{1}{32}^{nds}$ of an inch each major increment 42 represents in sum from an initial indicium, which is denoted with a zero (0) in the figures. More generally, in such instances, reference numerals 46 (also referred to as "numerical indicators") are used to indicate a running sum or total of the increments or, in other words, to indicate the distance between an initial indicium and the indicium to which the reference numeral is associated. In other variations, reference numerals may simply indicate the incremental distance between each adjacent major or minor increment. For example, in FIG. 3, each reference numeral 46 shown may be substituted with the number "4" to indicate that the distance between each major increment 42 is equal to four $\frac{1}{32}$" increments, or $\frac{4}{32}$".

Figure 5:
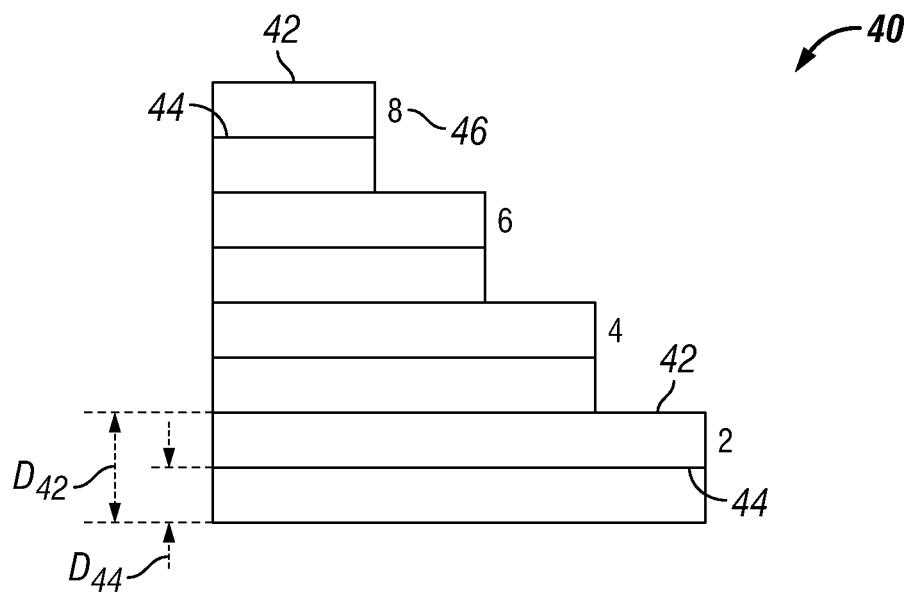
FIG. 5 is an enlarged side view showing an alternative to the indicia shown in FIG. 3, the alternative indicia forming a scale comprising stepped bars extending transversely (that is, in a direction normal to both a radial and an axial direction of the tire or wheel) and being stacked in a radial direction in accordance with an embodiment of the invention, where reference numerals are arranged adjacent each bar to indicate an increment associated with an increasing scale.
Figure 6:
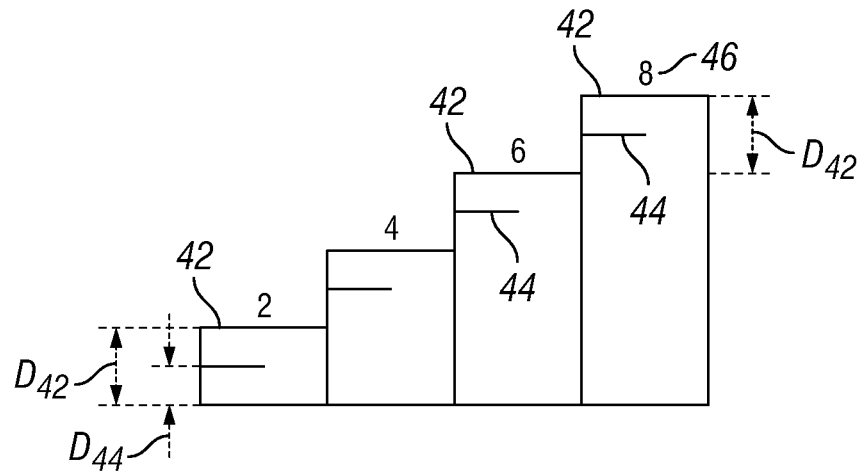
FIG. 6 is an enlarged side view showing an alternative to the indicia shown in FIG. 3, the alternative indicia forming a scale comprising stepped bars extending radially and being stacked in a transverse direction in accordance with an embodiment of the invention, where reference numerals are arranged adjacent each bar to indicate an increment associated with an increasing scale.
Figure 7:
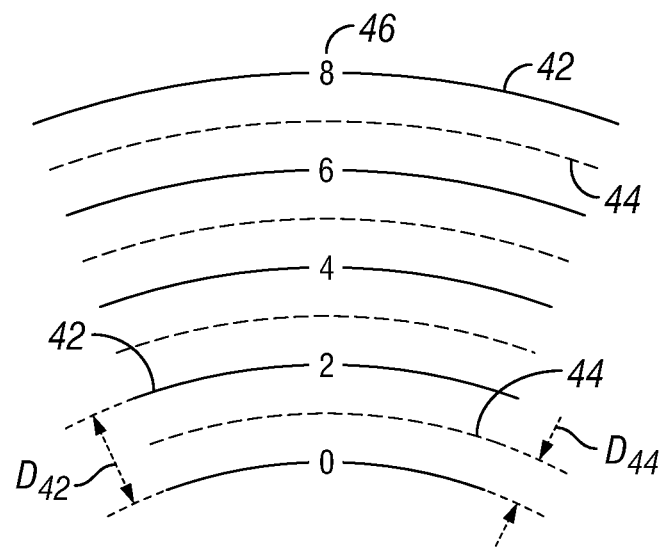
FIG. 7 is an side view showing an alternative to the embodiment of FIG. 3, whereby the increments extend transversely in an arcuate path concentric with the rotational axis of the tire, in accordance with an embodiment of the invention.

With reference now to FIGS. 5-7, particular embodiments of other indicia for use on any tire as previously described are shown. In FIG. 5, for example, an alternative indicia 40 forms a scale comprising stepped bars 48 extending transversely (that is, in a direction normal to both a radial and an axial direction of the tire or wheel). The radial height $D_{42}$ of each bar represents a major increment 42. Lines arranged midway through each bar represent a minor increment 44. Each bar 48 is stacked in a radial direction in accordance with an embodiment of the invention. Reference numerals 46 are provided adjacent each bar to indicate a total scaled measurement at the top of each bar. With reference now to FIG. 6, another embodiment of an indicia 40 is shown. The indicia 40 forms a scale comprising stepped bars 48 extending radially and being stacked in a transverse direction. Again, reference numerals 46 are provided adjacent each bar to indicate a total scaled measurement at the top of each bar. With reference now to the embodiment of FIG. 7, indicia 40 is shown similar to the indicia of FIGS. 2-3. However, the indicia extends transversely in an arcuate path concentric with the rotational axis of the tire. It follows that any indicia, including all of those shown and discussed herein, may extend along an arcuate path. Further, the arcuate path may continue to form a segment of any desired length, which is generally represented in FIG. 7, or may continue to extend annularly about the tire sidewall, in similar fashion to the guide rib 28 of FIG. 1.

Any indicia discussed or contemplated may be formed along the tire by any known means. For example, the indicia may be formed into the sidewall by any known abrading or cutting tool. By further example, the indicia may be molded into the sidewall by a molding operation. The indicia may comprise voids recessed into the sidewall, as is generally represented in FIG. 4, or may form material raised from an outer side surface of the sidewall (not shown). The indicia may also be painted onto the sidewall or adhesively applied, such as when the indicia is arranged on a label or the like in similar fashion to a barcode label. The indicia may further comprise colored material arranged within the sidewall.

As previously stated, the tire provided is mounted onto a wheel, the wheel having an annular rim upon which the bead portions of the tire are seated. The wheel rim extends laterally or axially relative a rotational axis of the wheel or tire between opposing rim flanges at which the rim terminates. In relation to the tire mounted upon the wheel, the rim flange extends along an outer side of each tire sidewall, and the indicia arranged along each sidewall extends radially outward from a top (or, in other words, the top elevation) of each rim flange. The tire may have been mounted by any means for mounting a tire onto a wheel that is known to one of ordinary skill in the art. Accordingly, such methods may further include the step of mounting the tire onto a wheel whereby a rim flange of the wheel terminates along an outer side of each tire sidewall and the indicia arranged along each sidewall extends radially outward from the terminal end of each rim flange.

In particular embodiments such methods further include the step of determining an indicial position where a top elevation of rim flange terminates relative the indicia at each of a plurality of locations arranged annularly about the tire. By determining where the top of the rim flange is elevationally positioned relative the indicia, an indicial position is determined along the indicia. The indicial position is determined by elevationally aligning the top of the rim flange with the a location along the indicia. In particular embodiments, "elevation" generally refers to a radial location relative a rotational axis of the tire or wheel, while "elevationally aligning" generally refers to determining an indicial position along the tire where the radial location of the top of the rim flange transposes in an axial direction onto the tire relative the indicia. For example, with reference to FIG. 3, the indicial position is determined to be the minor increment 44 arranged between reference numerals 0 and 4. Therefore, minor increment 44 represents a reference numeral 2, which is not shown. This indicial position is located along a length of the indicia, the indicia extending lengthwise in a radial direction of the tire. This step may be performed, for example, manually by observing visually the radial location along the indicia where the top of the rim flange terminates as the indicia extends outwardly from the top of the rim flange. While the indicial position is represented by an increment of the indicia in FIG. 3, it is understood that the indicial position may be determined to be located between increments 42, 44 or at other locations along indicia that are not associated with an increment marking.

Particular embodiments of such methods further includes the step of determining whether the tire is concentrically mounted on the wheel by comparing the indicial positions determined in the previous step at the plurality of annular locations. Once the indicial positions are determined at each of the plurality of locations, the positions are compared to determine if there is sufficient difference between any of the indicial positions to indicate that the tire is non-concentrically mounted on the wheel. The comparison results in a deviation value, where if it is determined that the difference between any indicia positions measured equal to or greater than the deviation value, non-concentric mounting is determined and corrective action is recommended or required. For example, if the indicia measurements differ by $2/32"$, which is the deviation value, the tire is non-concentrically mounted on the wheel. Of course, ay deviation value may be employed as desired. Presently, the Technology Maintenance Counsel of the American Trucking Association specifies a deviation value of $2/32"$. Corrective action may include deflating the tire, dismounting the tire, re-lubricating the bead portion of the tire with a lubricating composition to reduce the friction between the tire and the wheel, remounting the tire on the wheel, and re-inflating the tire.

The methods above have been discussed with reference to the tire shown in FIGS. 2-4. Such tire has been used for exemplary purposes, as is only one embodiment amongst many others employing any other indicia that may be desired for use in achieving the purposes and methods discussed herein. As such, the embodiments shown in the figures were merely used to more fully described in detail the performance of particular embodiments of such methods.

While this invention has been described with reference to particular embodiments thereof, it shall be understood that such description is by way of illustration and not by way of limitation. Accordingly, the scope and content of the invention are to be defined by the terms of the appended claims.

What is claimed is:

1. A tire comprising:
  a pair of annular sidewalls each extending radially inward from a tire tread portion to a terminal end, the terminal end including a bottom surface for engaging a wheel when the tire is mounted on a wheel; and,
  indicia arranged along each sidewall, where the indicia comprise a plurality of indicium positioned along each sidewall and arranged different distances radially outward from an initial indicium such that the indicia extend from a top side of a rim flange of a tire wheel when the tire is mounted on the wheel, where the indicia form a plurality of increments arranged in a radial direction of the tire to indicate a measured location of the rim flange along the tire sidewall for indicating concentric mounting of the tire on the wheel,
  wherein the indicia are arranged at each of three or more spaced-apart annular locations around each tire sidewall such that the indicia are discontinuous in a circumferential direction of the tire, and
  where the indicia comprise a plurality of bars, where the plurality of bars extend different distances in a direction transverse to the radial direction of the tire and are arranged side-by-side in the radial direction from the initial indicium such that the different distances provide a stepped arrangement comprising a plurality of steps, where each bar includes a major increment having a radial height and forming the radially outer side of the bar and a minor increment having a radial height and forming a line arranged midway through the bar that extends the entire transverse distance of the bar, all of the increments being uniformly spaced in the radial direction of the tire, where a reference numeral is arranged immediately adjacent to each step to separately identify a total scaled measurement for each of the major increments, the total scaled measurement being a distance from which the corresponding major increment extends from the initial indicium.

2. The tire of claim 1, where the increments are each equal to a whole number multiple of $1/32$ of an inch.

3. The tire of claim 1, where the indicia is arranged along each sidewall immediately adjacent a bottom of each sidewall terminal end, where the bottom surface of each terminal end extends in an axial direction between a heel and a toe, the heel arranged along an outer side of the tire and the toe arranged along an inner side of the tire, each of indicia being arranged immediately adjacent a heel of the terminal end.

4. A tire-wheel assembly comprising:
  a pair of annular sidewalls each extending radially inward from a tire tread portion to a terminal end, the terminal end including a bottom surface for engaging a wheel when the tire is mounted on a wheel; and,
  indicia arranged along each sidewall, where the indicia comprise a plurality of indicium positioned along each sidewall and arranged different distances radially outward from an initial indicium such that the indicia extend from a top side of a rim flange of a tire wheel when the tire is mounted on the wheel, where the indicia form a plurality of increments arranged in a radial direction of the tire to indicate a measured location of the rim flange along the tire sidewall for indicating concentric mounting of the tire on the wheel,
  wherein the indicia are arranged at each of three or more spaced-apart annular locations around each tire sidewall such that the indicia are discontinuous in a circumferential direction of the tire,
  where the indicia comprise a plurality of bars, where the plurality of bars extend different distances in a direction transverse to the radial direction of the tire and are arranged side-by-side in the radial direction from the initial indicium such that the different distances provide a stepped arrangement comprising a plurality of steps, where each bar includes a major increment having a radial height and forming the radially outer side of the bar and a minor increment having a radial height and forming a line arranged midway through the bar that extends the entire transverse distance of the bar, all of the increments are uniformly spaced in the radial direction of the tire, where a reference numeral is arranged immediately adjacent to each step to separately identify a total scaled measurement for each of the major increments, the total scaled measurement being a distance from which the corresponding major increment extends from the initial indicium; and, a wheel comprising a rim upon which the tire is mounted, the rim extending in an axial direction of the wheel between opposing terminal ends forming rim flanges, each of the rim flanges extending along one of the tire sidewalls such that the indicia are arranged relative the rim flange along each sidewall such that the indicia extend radially outward from a top of the rim flange.

5. The tire-wheel assembly of claim 4, wherein the top of the rim flange is elevationally aligned with the indicia.

6. The tire-wheel assembly of claim 4, where the indicia is arranged along each sidewall immediately adjacent a bottom of each sidewall terminal end, where the terminal end includes a bottom surface extending in an axial direction between a heel and a toe, the heel arranged along an outer side of the tire and the toe arranged along an inner side of the tire, each of indicia being arranged immediately adjacent a heel of the terminal end.

\* \* \* \* \*